United States Patent
Kim et al.

(10) Patent No.: US 6,856,371 B2
(45) Date of Patent: Feb. 15, 2005

(54) IN PLANE FRINGE FIELD SWITCHING MODE LCD REALIZING HIGH SCREEN QUALITY

(75) Inventors: Hyang Yul Kim, Kyoungki-do (KR); Seung Hee Lee, Kyoungki-do (KR); Jai Wan Koh, Kyoungki-do (KR)

(73) Assignee: Boe-Hydis Technology Co., Ltd., Kyoungki-do (KR)

( * ) Notice: Subject to any disclaimer, the term of this patent is extended or adjusted under 35 U.S.C. 154(b) by 37 days.

(21) Appl. No.: 10/138,977

(22) Filed: May 3, 2002

(65) Prior Publication Data

US 2002/0163604 A1 Nov. 7, 2002

(30) Foreign Application Priority Data

May 7, 2001 (KR) .......................................... 2001-24648

(51) Int. Cl.⁷ ............................................. G02F 1/1343
(52) U.S. Cl. ..................................................... 349/141
(58) Field of Search ................................. 349/141, 142, 349/143, 38, 43

(56) References Cited

U.S. PATENT DOCUMENTS 5,969,782 A * 10/1999 Lee et al. ................... 349/141
6,177,970 B1 * 1/2001 Kim ............................ 349/43
2002/0021396 A1 * 2/2002 Yoo et al.

* cited by examiner

*Primary Examiner*—Dung T. Nguyen
*Assistant Examiner*—Thoi V. Duong
(74) *Attorney, Agent, or Firm*—Ladas & Parry LLP

(57) ABSTRACT

High screen quality In Plane-Fringe Field Switching mode Liquid Crystal Device ("LCD") having plural gate bus and data bus line cross-arranged on a transparent substrate; common bus lines parallel with the gate bus line; thin film transistor at the intersection of the gate bus and the data bus lines; counter electrode, including a first body parallel with the data bus lines and a plurality of first branches, the end of one side being in contact with the first body, the first branches having a predetermined angle symmetric with the common bus line; and pixel electrode, including a second body parallel with the data bus line and plural second branches, the other end being in contact with the second body and the one end being extended to the upper part of the first branches, the second branches being on the same layer with the first branches, extending parallel between the first branches.

13 Claims, 4 Drawing Sheets

IN PLANE FRINGE FIELD SWITCHING MODE LCD REALIZING HIGH SCREEN QUALITY

BACKGROUND OF THE INVENTION

1. Field of the Invention

The present invention relates to a Liquid Crystal Display (hereinafter, referred to as LCD) and, more particularly, to an In Plane Fringe Field Switching Mode LCD wherein a counter electrode and a pixel electrode are formed on the same layer.

2. Description of the Prior Art

In TN (Twisted Nematic) mode LCD, liquid crystal molecules are twisted in 90° by the voltage applied to a counter electrode on an upper substrate and a pixel electrode on a lower substrate, thereby realizing display. The TN mode LCD has advantages that it is easy to drive and the fabrication process is simple. However, it also has disadvantages that viewing angle is narrow and response time is slow, thereby there are limitations in its application.

Therefore, In Plane Switching (hereinafter, referred to as IPS) mode LCD has been proposed to solve the problem of the TN mode. The IPS mode LCD has advantages of wide viewing angle and rapid response time, however, it has disadvantages of low aperture ratio and transmittance due to the fact that counter and pixel electrodes are made of opaque metals.

In order to overcome low aperture ratio and transmittance of the IPS mode LCD, a Fringe Field Switching (hereinafter, referred to as FFS) mode LCD has been proposed by the present applicant. In the FFS mode LCD, the counter electrode and the pixel electrode are made of transparent metals, for example, ITO and the distance between the counter electrode and the pixel electrode is narrower than a cell gap, thereby realizing high brightness and wide viewing angle.

And, the present applicant also has proposed an In Plane Fringe-Field Switching (hereinafter, referred to as IP-FFS) mode LCD realizing high screen quality by arranging the counter and pixel electrodes on the same layer.

FIG. 1 is a plan view showing the electrode structure of conventional IP-FFS mode LCD.

Referring to FIG. 1, a gate bus line 12 and a data bus line 16 are cross-arranged. A thin film transistor 17 is arranged at the intersection of the gate bus line 12 and the data bus line 16, as a switch. A common bus line 14 is arranged on the center of unit pixel defined by the gate bus line 12 and the data bus line 16, being parallel with the gate bus line 12.

A counter electrode 18 and a pixel electrode 19 are formed on the same layer by ITO patterning, respectively including bodies 18a, 19a and a plurality of branches 18b, 19b, 19c. The branches of counter electrode and pixel electrode 18b, 19b are alternately arranged, having a predetermined angle symmetric with respect to the common bus line 14. The counter electrode 18 is in contact with the common bus line 14. The pixel electrode 19 is in contact with the thin film transistor 17, further including a center branch 19c on the upper part of common bus line 14, being parallel with the common bus line. The center branch 19c is formed in order to form storage capacitance.

In the IP-FFS mode LCD, the counter electrode and pixel electrode are arranged on the same layer by ITO patterning, thereby having advantages in afterimages and cost reduction, compared with FFS mode LCD wherein the counter electrode has a plate structure and the pixel electrode has a slit structure, arranged on the different layers. And, in the IP-FFS mode LCD, the counter electrode and the pixel electrode are arranged in the unit pixel to form two domains, thereby preventing color shift generation.

As a result, the IP-FFS mode LCD has advantages in afterimages and cost reduction, compared with the FFS mode LCD, thereby realizing high screen quality.

However, in the IP-FFS mode LCD, a short may be generated between the counter electrode and the pixel electrode since they are formed on the same layer. In order to prevent the short generation, branches of counter electrode and pixel electrode are arranged with a distance of over 3 $\mu$m. The body of counter electrode also maintains the same distance with the branch end of pixel electrode and the body of pixel electrode maintains the same distance, over 3 $\mu$m, with the branch end of counter electrode.

When the body of counter electrode and the branch end of pixel electrode, and the body of pixel electrode and the branch end of counter electrode are arranged with a good distance, electric fields are formed between each body and branch end. The direction of electric field corresponds to initial arrangement of rubbed liquid crystal molecules. Therefore, liquid crystal molecules are not twisted in the regions between the body of each electrode and the branch end thereof, thereby lowering transmittance of the IP-FFS mode LCD.

SUMMARY OF THE INVENTION

Therefore, an object of the present invention is to provide an IP-FFS mode LCD capable of realizing high screen quality by preventing lowering of transmittance.

In order to accomplish the above-mentioned object, the present IP-FFS mode LCD comprises a transparent insulating substrate; a plurality of gate bus lines and data bus lines cross-arranged on the substrate defining a plurality of unit pixels; at least one common bus line arranged on a central part of each of the unit pixels to be parallel with the gate bus line; for each unit pixel, a thin film transistor arranged at the intersection of the gate bus line and the data bus line; a counter electrode arranged in each unit pixel, including a first body arranged to be parallel with the data bus line on the edge of one side of each unit pixel and having a plurality of first branches, the end of each branch being in contact with the first body and the other end of each first branch extending away from the first body toward the other edge of the unit pixel wherein the first branches are made of ITO and are arranged having a predetermined angle symmetric with respect to the common bus line; and a pixel electrode arranged in each pixel to be in contact with the thin film transistor, including a second body arranged to be parallel with the data bus line at the opposite edge of the unit pixel from the first body and being located under the other ends of the first branches, being parallel with the data bus line and having a plurality of second branches, one end of each second branch being in contact with the second body and the other end extending to a location above the first body, wherein the second branches are made of ITO and are arranged on the same layer as the first branches, so that the second branches are disposed between and oriented parallel to the first branches.

And, the IP-FFS mode LCD of the present embodiment further comprises a gate insulating layer interposed between the gate bus line and the data bus line and a protective layer between the data bus line and first and second branches of counter and pixel electrodes.

According to the present embodiment, the first body of the counter electrode is formed as a built-in type so as to be directly connected with the common bus line and the second body of the pixel electrode is arranged on the same layer with the data bus line. Each first branch of the counter electrode is in contact with the first body by means of a first contact hole passing through the protective layer and the gate insulating layer, and the second branch of each pixel electrode is in contact with the second body by means of a second contact hole passing through the protective layer. Moreover, the pixel electrode further comprises a central branch arranged on the upper part of common bus line to form a means for providing storage capacitance.

According to another embodiment of the present invention, the IP-FFS mode LCD includes a transparent insulating substrate; a plurality of gate bus lines and data bus lines cross-arranged on the substrate defining a plurality of unit pixels; a common bus line arranged on the central part of each unit pixel being parallel with the gate bus line and having a storage capacitance electrode arranged adjacent to the data bus line in the unit pixel and parallel therewith; for each unit pixel, a thin film transistor arranged at the intersection of the gate bus line and the data bus line; a counter electrode arranged in each unit pixel, including a first body arranged on the edge of the unit pixel to be parallel with the data bus line and having a plurality of first branches, the end of each branch being in contact with the first body and the other end of each branch being separated from the storage capacitance electrode and extending toward the other edge of the unit pixel, wherein the first branches are made of ITO and each first branch having a predetermined angle symmetric with respect to the common bus line; and a pixel electrode arranged in each unit pixel to be in contact with the thin film transistor, including a second body arranged on the edge of other side of the unit pixel to be parallel with the data bus line and to overlap with the storage capacitance electrode and a plurality of second branches connected to and extending from the second body to a location in a layer above the first body, wherein the second branches are made of ITO and are arranged on the same layer with the first branches, so that the second branches are disposed between and are oriented parallel relative to the first branches.

And, the IP-FFS mode LCD of the present embodiment further comprises a gate insulating layer interposed between the gate bus line and the data bus line and a protective layer between the data bus line and the first and the second branches of counter and pixel electrodes.

According to this embodiment, the first body of the counter electrode is formed as a built-in type so as to be directly connected with the common bus line and the second body of the pixel electrode is formed as a built-in type together with the second branch through ITO patterning. Each first branch of the counter electrode is in contact with the first body by means of a contact hole passing through the protective layer and the gate insulating layer. Moreover, each pixel electrode further comprises a central branch arranged on the protective layer above the common bus line to form storage capacitance.

BRIEF DESCRIPTION OF THE DRAWINGS

The objects and features of the invention may be understood with reference to the following detailed description of an illustrative embodiment of the invention, taken together with the accompanying drawings.

DETAILED DESCRIPTION OF THE INVENTION

Figure 1:
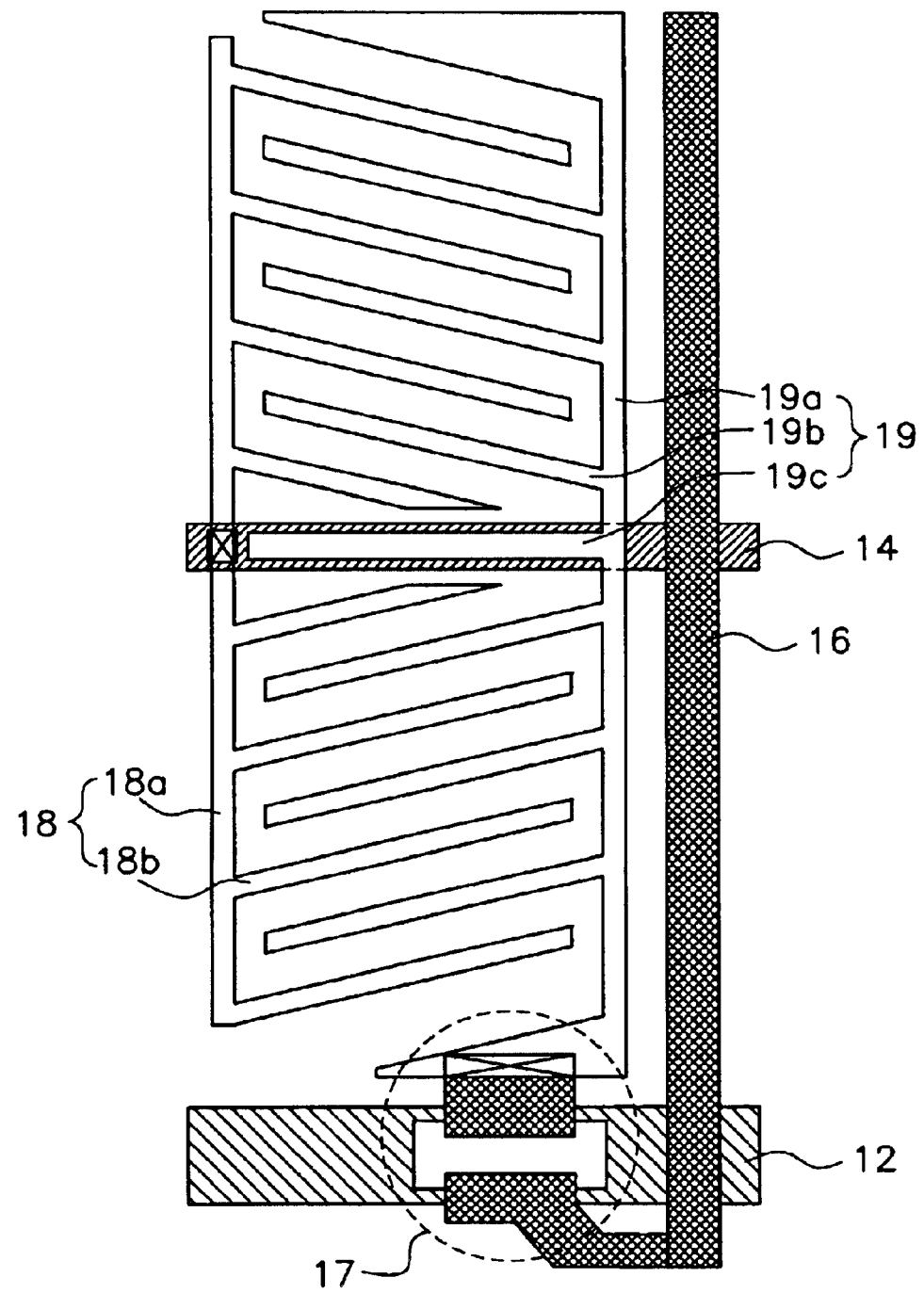
FIG. 1 is a plan view showing an electrode structure of conventional IP-FFS mode LCD.
Figure 2:
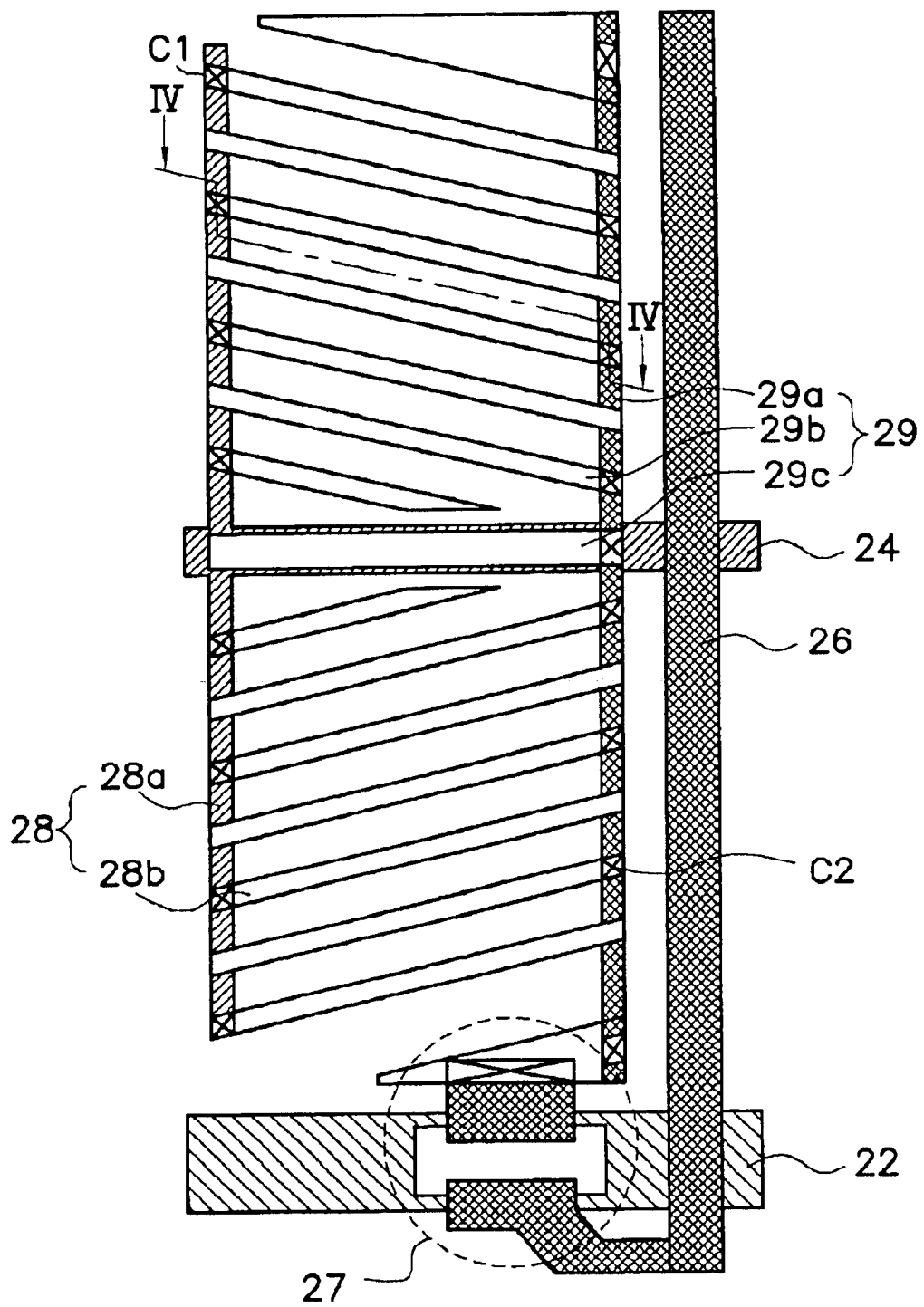
FIG. 2 is a plan view showing an IP-FFS mode LCD according to an embodiment of the present invention.

Referring to FIG. 2, a plurality of gate bus lines 22 and data bus lines 26 are cross-arranged on a transparent insulating substrate, desirably, on a glass substrate (not illustrated). A gate insulating layer (not illustrated) is interposed between the gate bus line 22 and the data bus line 26. A common bus line 24 is arranged on a center part of unit pixel defined by the gate bus line 22 and the data bus line 26, being parallel with the gate bus line 22. A thin film transistor 27 is arranged at the intersection of the gate bus line 22 and the data bus line 26, as a switching device. A counter electrode 28 and a pixel electrode 29 are arranged in each unit pixel, respectively including bodies 28a, 29a and a plurality of branches 28b, 29b, 29c. A protective layer (not illustrated) is interposed between the data bus line 26 and the branches 28b, 29b, 29c of counter electrode 28 and pixel electrode 29.

Figure 3:
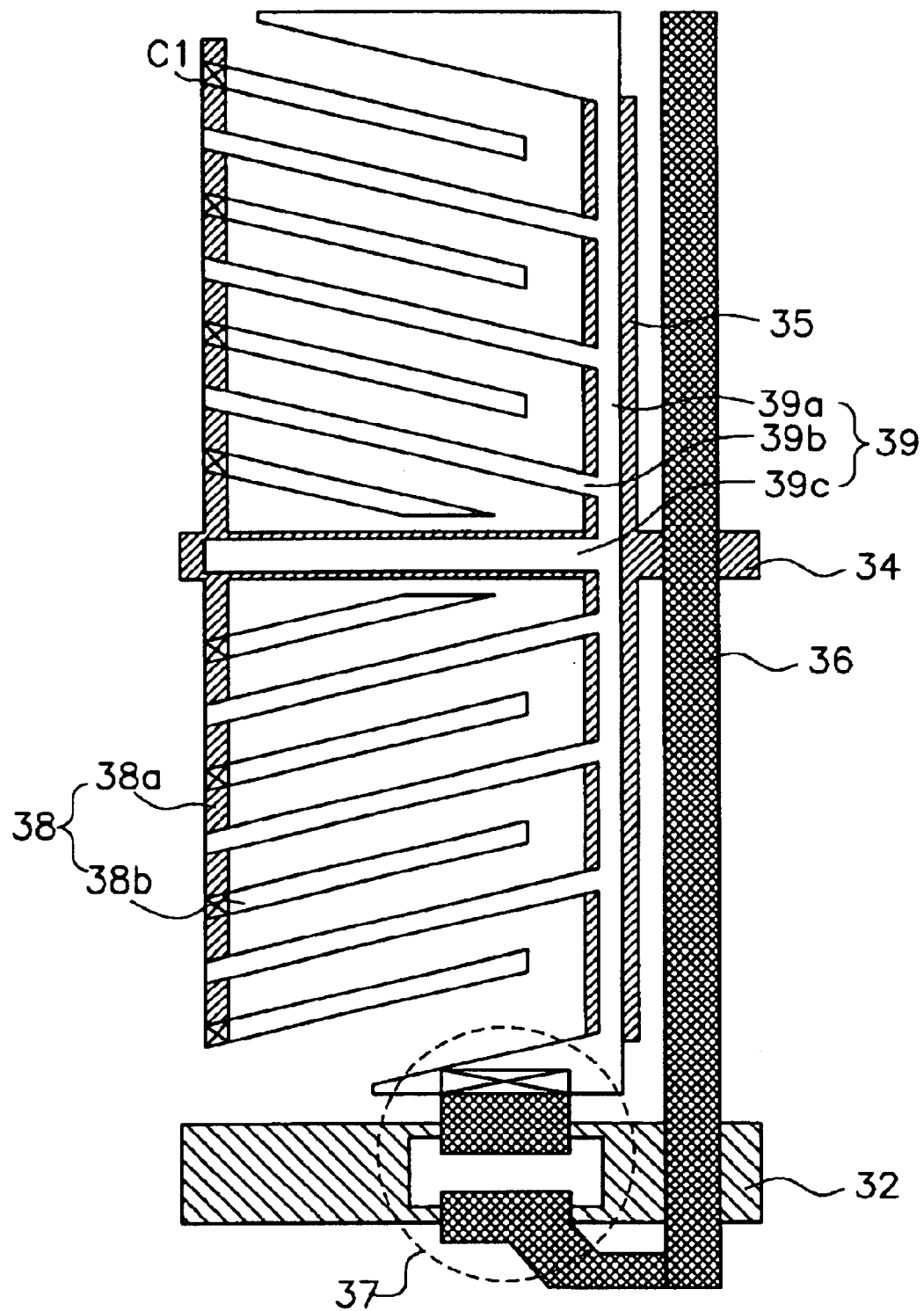
FIG. 3 is a plan view showing an IP-FFS mode LCD according to another embodiment of the present invention.
Figure 4:
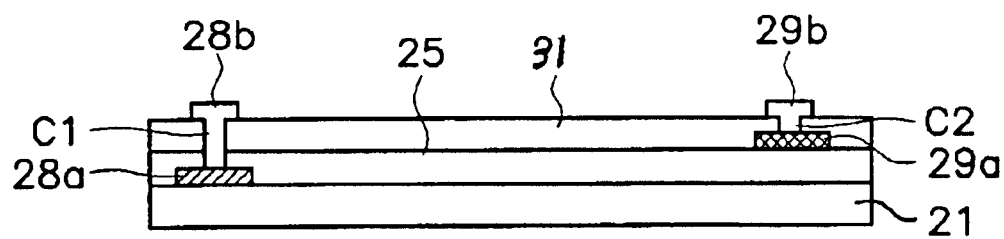
FIG. 4 is a cross-sectional view showing an IP-FFS mode LCD according to the embodiment shown in FIG. 2, taken approximately along the section lines IV—IV.

The body of counter electrode is arranged on the edge of one side of unit pixel to be parallel with the data bus line 26. The body 28a of counter electrode is formed at the same time with the gate bus line 22 and the common bus line 24, in a built-in type with the common bus line 24. As shown in FIG. 4, the branches 28b of counter electrode are formed on the protective layer 31 through ITO patterning and are shown in FIGS. 2 and 3 to be arranged having a predetermined angle symmetric with respect to the common bus line 24. In the branches 28b of counter electrode, the end of one side is in contact with the body 28a and the end of the other side is arranged on the upper part of body 29a of pixel electrode. The body 28a and the branch 28b of the counter electrode maintain contact by a first contact hole C1, (illustrated in FIG. 4,) passing through the protective layer 31 and the gate insulating layer 25.

The body 29a of pixel electrode is arranged on the edge of the other side of unit pixel to be parallel with the data bus line 26 (FIG. 3). The body 29a of the pixel electrode is formed on the gate insulating layer 25 (FIG. 4) at the same time with the data bus line 26. The branches 29b, 29c of the pixel electrode are formed on the same layer with the branches 28b of the counter electrode, that is, on the protective layer 31, through ITO patterning and arranged between branches 28b of adjacent counter electrode to be parallel therewith. The body 29a and the branch 29b of the pixel electrode maintain contact by a second contact hole C2, illustrated in FIG. 4, passing through the protective layer 31.

The bodies 28a, 29a of the counter and the pixel electrodes are formed to have a predetermined width, desirably, 6 $\mu$m. The branches 28b, 29b, 29c of the counter and pixel electrodes also have a predetermined width, desirably, less than 8 $\mu$m and the center branch 29c of pixel electrode has a width of approximately 8 $\mu$m to have storage capacitance. The branches 28b, 29b of counter and pixel electrodes are arranged with a distance of less than 10 $\mu$m, more desirably, 3~10 $\mu$m.

Although it is not shown in the drawings, a lower substrate having the above structure are combined with an upper substrate having a color filter, with a liquid crystal layer interposed, thereby completing IP-FFS mode LCD. The horizontal alignment layers are attached to inner sides of each substrate and polarizing plates are attached to outer sides thereof.

According to the present invention, the body of counter electrode is arranged on the substrate having a common bus line and the body of pixel electrode is arranged on a gate insulating layer having a data bus line. Therefore, it is possible to extend the branches of counter and pixel electrodes arranged on the protective layer to the upper part of bodies of pixel and counter electrodes, respectively.

As a result, in the IP-FFS mode LCD of the present invention, the initial arrangement of rubbed liquid crystal molecules has a predetermined angle with the direction of electric field in the regions between the body of counter electrode and the branch end of pixel electrode and between the body of pixel electrode and branch end of counter electrode. Therefore, liquid crystal molecules are twisted by electric field in the regions, thereby realizing high screen quality without lowering of transmittance.

FIG. 3 is a plan view showing IP-FFS mode LCD according to another embodiment of the present invention. The elements have the same structures with those in the above-mentioned embodiment. The following explanation is focused on the points different from the above embodiment.

The present embodiment is similar to the former one in that a counter electrode 38 is formed in a built-in type with a common bus line 34, branches 38a are formed on a protective layer through ITO patterning, and the body 38a and the branches 38b maintain contact C1 by a contact hole passing through the protective layer and the gate insulating layer.

The pixel electrode 39 comprises a body 39a and branches 39b, 39c, being in contact with a thin film transistor 37. However, the body and the branches 39a, 39b, 39c are formed on the protective layer in a built-in type through ITO patterning.

And, a storage capacitance electrode 35 is additionally formed on the lower part of body 39a of pixel electrode to form storage capacitance, being parallel with the data bus line 36. The storage capacitance electrode 35 is formed at the same time with the gate bus line 32 and the common bus line 34, overlapping with the body 39a of pixel electrode with the gate insulating layer and the protective layer interposed, thereby forming additional storage capacitance.

According to the present embodiment, the IP-FFS mode LCD has increased storage capacitance, compared with the former embodiments. Therefore, the transmittance is slightly decreased, however, it is possible to prevent lowering of screen quality by the storage capacitance.

That is, the IP-FFS mode LCD has a very small amount of storage capacitance, compared with that in FFS mode LCD. This is because the IP-FFS mode LCD can obtain storage capacitance only by overlap of common bus line and center branch of pixel electrode. On the other hand, the FFS mode LCD can obtain storage capacitance by overlap of counter electrode having plate structure and pixel electrode having slit structure. The storage capacitance is essential element to accomplish improvement of screen quality, thereby causing lowering of screen quality when the storage capacitance is decreased below a predetermined level.

In the IP-FFS mode LCD of the above embodiment, storage capacitance is formed between the common bus line and center branch of pixel electrode, and additionally, it is also formed between the storage capacitance electrode and the body of pixel electrode, thereby it is possible to obtain storage capacitance to a desired level. Therefore, the liquid crystal molecules are not twisted in the region between the body of pixel electrode and the branch end of counter electrode, thereby lowering the transmittance, compared with the former embodiments. However, it is possible to prevent lowering of screen quality due to storage capacitance.

As described above, the present invention can improve transmittance and thereby, accomplish high screen quality LCD since the counter electrode and the pixel electrode respectively comprise bodies and branches and each branch end is extended to the upper part of the other body. And, it has an advantage in obtaining storage capacitance by additionally forming storage capacitance electrode.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An In Plane-Fringe Field Switching ("IP-FFS") mode Liquid Crystal Device ("LCD") comprising: a transparent insulating substrate; a plurality of gate bus lines and data bus lines cross-arranged on the substrate defining a plurality of unit pixels; at least one common bus line arranged on a central part of each of the unit pixels, being parallel with the gate bus lines; for each unit pixel, a thin film transistor arranged at the intersection of the gate bus line and the data bus line; a counter electrode arranged in each unit pixel, including a first body arranged on the edge of one side of each unit pixel to be parallel with the data bus line and having a plurality of first branches, a gate insulating layer and a protective layer disposed over the first body, the end of each first branch being in contact with the first body through a contact hole passing through the gate insulating layer and the protective layer disposed over the first body, and the other end of each first branch extending away from the first body toward the other edge of the unit pixel, wherein the first branches are made of ITO and are arranged having a predetermined angle symmetric with respect to the common bus line; and a pixel electrode arranged in each unit pixel to be in contact with the thin film transistor, including a second body arranged on the other edge of the unit pixel at the opposite edge of the unit pixel from the first body, the protective layer disposed over the second body, the second body being located on the gate insulating layer and under the other ends of the first branches, the second body being parallel with the data bus line and having a plurality of second branches, one end of each second branch being in contact with the second body through a contact hole passing through the protective layer disposed over the second body and the other end of each second branch extending to a location above the first body, wherein the second branches are made of ITO and are arranged on the same layer with the first branches, so that the second branches are disposed between and oriented parallel to the first branches.

2. The IP-FFS mode LCD according to claim 1, wherein the a gate insulating layer is interposed between the gate bus line and the data bus line and the protective layer between the data bus line and first and second branches of the counter and pixel electrodes.

3. The IP-FFS mode LCD according to claim 1, wherein the first body of the counter electrode is formed as a built-in type so as to be directly connected with the common bus line.

4. The IP-FFS mode LCD according to claim 1, wherein the second body of the pixel electrode is arranged on the same layer with the data bus line.

5. The IP-FFS mode LCD according to claim 2, wherein the pixel electrode further comprises a central branch arranged on the protective layer above the common bus line to form a means for providing storage capacitance.

6. The IP-FFS mode LCD according to claim 1 wherein the predetermined angle between the first and second branches and the common bus line is about 20°.

7. An In Plane-Fringe Field Switching ("IP-FFS") mode Liquid Crystal Device ("LCD") comprising: a transparent insulating substrate; a plurality of gate bus lines and data bus lines cross-arranged on the substrate, defining a plurality of unit pixels; a common bus line arranged on the central part of each unit pixel, being parallel with the gate bus line and having a storage capacitance electrode arranged in the unit pixel, adjacent to the data bus line and parallel therewith; for each unit pixel, a thin film transistor arranged at the intersection of the gate bus line and the data bus line; a counter electrode arranged in each unit pixel, including a first body arranged on the edge of the unit pixel to be parallel with the data bus line and having a plurality of first branches, the end of each first branch being in contact with the first body and the other end of each first branch being separated from the storage capacitance electrode by a gate insulating layer and a protective layer disposed over the first body and extending toward the other edge of the unit pixel, wherein the first branches are made of ITO, each first branch having a predetermined angle symmetric with respect to the common bus line; and a pixel electrode arranged in each unit pixel to be in contact with the thin film transistor, including a second body arranged on the edge of the other side of unit pixel to be parallel with the data bus line and to overlap with the storage capacitance electrode and a plurality of second branches connected to and extending from the second body to a location on the protective layer directly above the first body, wherein the second branches are made of ITO and are arranged on the protective layer together with the first branches, so that the second branches are disposed between and oriented parallel relative to the first branches, but not in contact therewith.

8. The IP-FFS mode LCD according to claim 7, wherein the gate insulating layer is interposed between the gate bus line and the data bus line and the protective layer is interposed between the data bus line and the first and the second branches of counter and pixel electrodes.

9. The IP-FFS mode LCD according to claim 8, wherein each first branch of the counter electrode is in contact with the first body by means of a contact hole passing through the protective layer and the gate insulating layer.

10. The IP-FFS mode LCD according to claim 7, wherein the first body of the counter electrode is formed as a built-in type so as to be directly connected with the common bus line.

11. The IP-FFS mode LCD according to claim 7, wherein the second body of the pixel electrode is formed as a built-in type together with the second branches through ITO patterning.

12. The IP-FFS mode LCD according to claim 8, wherein each pixel electrode further comprises a central branch arranged on the protective layer above the common bus line to form storage capacitance.

13. The IP-FFS mode LCD according to claim 7 wherein the predetermined angle between the first and second branches and the common bus line is about 20°.

* * * * *